Aug. 24, 1965    J. J. McELHONE ETAL    3,202,224
TOBACCO PLANT CULTIVATING ASSEMBLIES
Filed Nov. 12, 1963

INVENTORS JAS. J. McELHONE
TERENCE P. McELHONE
BY

THEIR ATTORNEY

United States Patent Office 3,202,224
Patented Aug. 24, 1965

3,202,224
TOBACCO PLANT CULTIVATING ASSEMBLIES
James J. McElhone, R.R. 1, La Salette, Ontario, and Terence P. McElhone, 161 Church St., Brampton, Ontario, Canada
Filed Nov. 12, 1963, Ser. No. 322,987
2 Claims. (Cl. 172—305)

The present invention relates to tobacco plant cultivating assemblies, a principal object being to provide an assembly of the character herein described which is of conspicuously simple construction and accordingly designed to sell for a modest price, being designed for attachment to a conventional tractor adjacent to the front wheels thereof, and from thence to project forwardly to one side of the tractor engine and transmission so that it is in line ahead of the operator when seated in the driving position, all to the end that the cultivation of tobacco plants may be effected by the tractor operator alone in contrast to present practice which involves the employment of two persons, one operating the tractor for the purpose of hilling the plant row, and another to cultivate the actual plants.

With the foregoing objects in view, and such others as may become apparent as this specification proceeds, the present invention consists in the following arrangement and construction of parts, all as hereinafter, more particularly described, reference being had to the accompanying figures in which.

In the drawings, like characters of reference designate similar parts in the several figures.

Figure 1:
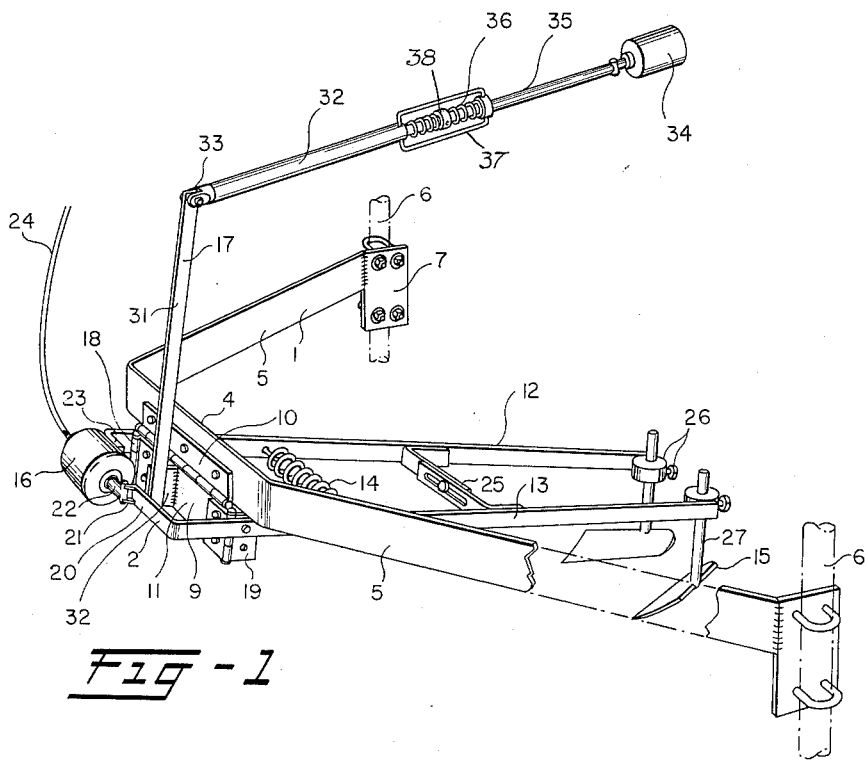
FIGURE 1 is a perspective representation of the present invention.

The present invention consists essentially of two parts in co-operative combination, that is to say, the frame-work collectively designated 1, and a cultivating unit collectively designated 2, the associated tractor being designated 3.

Essentially, by way of preliminary description it may be said that in the present invention the said frame-work comprises a mid-piece 4, rearwardly divergent side pieces 5 so as to constitute what may broadly be described as a yoke, the same being attached to the tractor knuckles 6 or like parts, by means of the plate and twin clevis assemblies collectively designated 7, adjacent to the front tractor wheels 8.

Essentially again the unit 2 comprises a 2-plate hinge collectively designated 9, the plates 10 and 11 thereof being hinged to the mid-piece 4, and having attached to the ends thereof a pair of cultivating arms 12 and 13 spring-biased toward each other as at 14, cultivating elements 15 being provided at the rear or distal ends of the said arms 12 and 13.

The cultivating arm 13 is operated by the solenoid 16, constituting the essential, and only part which it is deemed necessary to describe, of electrically operated means for swinging the arms 12 and 13 laterally as to be hereafter more fully described. Means for raising the cultivating elements 15 and for lowering the same selectively are embodied in the post and rod assembly collectively designated 17 secured to free plate 11.

The foregoing essential and preliminary description is now augmented by the following statement.

It will be recognized that the hinge 10 is of horizontally elongated configuration, and that the free plate 11 depends downwardly therefrom free of mid-piece 4. The arms 12 and 13 are connected to plate 11 at the opposite ends thereof by hinges 18 and 19. Accordingly they are designed to rotate horizontally and oppositely due to solenoid 16 being secured as illustrated to the angulated portion 20 of arm 12, and the rotary connection 21 between the end-shiftable solenoid-rod 22 and the angulated portion 23 of arm 12, may conveniently be welded to the right angled portion 23 at the forward end of fixed arm 12.

From the immediate foregoing it will be apparent that upon actuation of the solenoid by the tractor driver via the lead 24, arms 12 and 13 may be swung away from each other but may nevertheless, if preferred, normally be held slightly spaced apart under the influence of the expansion-bias of coil spring 14 as relaxed, extending between them. Excessive expansion is prevented by means of the slotted distance-piece assembly 25 the operation of which will be apparent to all skilled in the elementary mechanical arts.

Cultivating elements 15 are adjustably secured to the distal ends of arms 12 and 13 by means of the bearing and set-screw assemblies 26, such elements including stub shafts 27 vertically and rotatably adjustable within the aforesaid parts 26.

Figure 2:
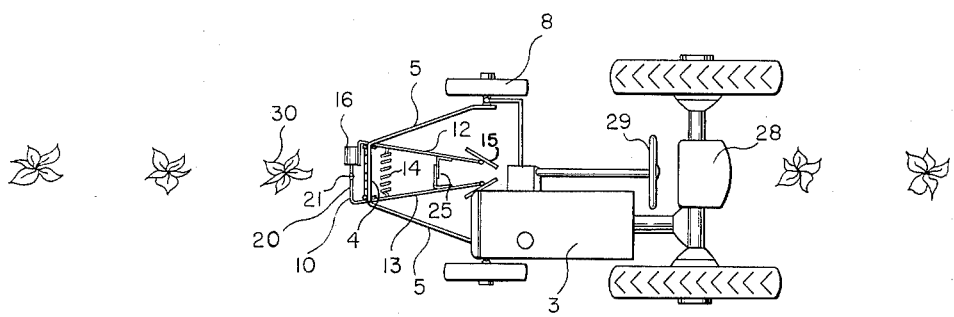
FIGURE 2 is a schematized plan view of the present invention in its environment, and showing the manner in which the same is attached to a tractor.

For purposes of orientation it is to be understood that numeral 28 designates the tractor seat and hence the operator's driving position, and 29 the steering wheel. As a result it will be apparent from a contemplation of the accompanying FIGURE 2 that the driver can clearly see the cultivating elements 15 and manipulate the same with respect to plants 30 with considerable delicacy and accuracy.

Assembly 17 aforesaid comprises in detail the post 31 welded at 32 to the mid-point of free plate 11 to project upwardly therefrom and hence be swingable in a vertical plane forwardly and backwardly under the influence of the end-shiftable operating rod 32 which is freely connected to 31 at point 33.

A hydraulic unit conventionally represented as 34 is mechanically associated with the rear-end of rod 32 whereby the cultivating arm assembly may be raised and lowered with insignificant manual effort, and it will be noted that rod 34 includes the secondary portion 35, and the intermediate spring assembly collectively designated 36, it being understood that portion 35 is telescopically related to the forward portion of the rod and spring-biased by means of the aforesaid assembly 36 to allow for undulations and vibrations transmitted from the soil through the elements 15 during the passage of the tractor, with the yoke 37 functioning as a steady-rest and bearing for portion 35 which portion has the collar 38 brazed to it and bearing against the springs between which it is positioned.

Since various modifications can be made in the invention hereinbefore described and as illustrated in the accompanying drawings, and numerous variations made thereto all within the spirit and scope of the invention without departing from such spirit and scope, it is intended that the said description and drawings are to be interpreted as illustrative only, and not in a limiting sense.

What we claim as our invention is:

1. A tobacco plant cultivating assembly comprising in combination, a frame-work attached to a tractor in advance of the tractor operator's driving position, and a cultivating unit, said cultivating unit being attached to said frame-work, and comprising, in sub-combination a pair of cultivating arms having front and rear ends, a cultivating element on the rear ends of each of said arms, element-operating means including expansible power means for swinging at least one of said arms toward or away from the other, said frame-work being in the form of a horizontal yoke embodying a mid-piece and a pair of mutually divergent side-arms extending rearwardly from said mid-piece, said frame-work being attachable to said tractor in the vicinity of the front wheels thereof, said cultivating unit including at least one 2-plate hinge one plate of which is fixed to the said mid-piece, the other plate of which rotates about a horizontal transverse axis, said cultivating arms being attachable to the rotatable plate of said hinge, at least one of said arms being mounted for pivotal movement about a vertical axis, for vertical swinging movement about a horizontal axis, and extending rearwardly between said divergent side-arms of said yoke, said cultivating arms being spring-biased toward each other, and extending in advance of said mid-piece, said solenoid means extending between said arms for separating said rear ends thereof against said spring bias, upon energization thereof, and an upwardly projecting rod operatively secured between said front ends of said cultivating arms to the rotatable plate, for raising or lowering the same and said cultivating elements into out-of-use and operating positions respectively, in a vertical arc upon rotation in a vertical plane of said upwardly projecting rod.

2. The arrangements according to claim 1 in which said two-part hinge is secured to extend below said mid-piece, in which one of the plates of said hinge is free to swing about a horizontal axis, one of said cultivating rods being secured to said freely swingable plate, said cultivating unit being wholly secured below said mid-piece for limited vertical rotation upon the actuation of said upwardly projecting rod between said rearwardly divergent arms.

References Cited by the Examiner

UNITED STATES PATENTS

| | | | |
|---|---|---|---|
| 424,962 | 4/90 | Crews | 172—642 |
| 1,068,560 | 7/13 | Bean | 172—414 |
| 2,218,948 | 10/40 | Cooper | 172—276 |
| 2,413,429 | 12/46 | Bomford | 172—346 |
| 2,449,159 | 9/48 | Brown | 172—276 |
| 2,592,689 | 4/52 | Hann | 172—6 |
| 2,663,240 | 12/53 | Bauer | 172—276 |
| 2,961,054 | 11/60 | Green | 172—305 |
| 3,066,747 | 12/62 | Rozak | 172—642 X |

ABRAHAM G. STONE, *Primary Examiner.*